(12) United States Patent
Lucas et al.

(10) Patent No.: US 10,000,230 B2
(45) Date of Patent: Jun. 19, 2018

(54) VEHICLE FOR LINE MARKING

(71) Applicants: Rex Cameron Lucas, Wooragee (AU); Carl William Watson, Koo Wee Rup (AU)

(72) Inventors: Rex Cameron Lucas, Wooragee (AU); Carl William Watson, Koo Wee Rup (AU)

(73) Assignee: Diane Lee Watson, Victoria (AU)

( * ) Notice: Subject to any disclaimer, the term of this patent is extended or adjusted under 35 U.S.C. 154(b) by 185 days.

(21) Appl. No.: 14/436,656

(22) PCT Filed: Oct. 17, 2013

(86) PCT No.: PCT/AU2013/001203
§ 371 (c)(1),
(2) Date: Apr. 17, 2015

(87) PCT Pub. No.: WO2014/059480
PCT Pub. Date: Apr. 24, 2014

(65) Prior Publication Data
US 2015/0275445 A1  Oct. 1, 2015

(30) Foreign Application Priority Data
Oct. 17, 2012 (AU) ................................ 2012904545

(51) Int. Cl.
*B62D 1/20* (2006.01)
*B62D 1/16* (2006.01)
(Continued)

(52) U.S. Cl.
CPC .............. *B62D 1/20* (2013.01); *A63C 19/065* (2013.01); *B05B 13/005* (2013.01); *B60K 26/02* (2013.01);
(Continued)

(58) Field of Classification Search
CPC ... B62D 1/16; B62D 1/20; B62D 3/00; B62D 3/02
(Continued)

(56) References Cited

U.S. PATENT DOCUMENTS 2,727,581 A * 12/1955 Wright ................... B62D 49/04
180/11
3,064,745 A * 11/1962 Colt ....................... B60K 17/30
180/236
(Continued)

FOREIGN PATENT DOCUMENTS

CN 201963618 U 9/2011
EP 0008305 A1 3/1980
(Continued)

OTHER PUBLICATIONS

Notification of transmittal of the international search report and the written opinion of the international searching authority, dated Dec. 4, 2013.

Primary Examiner — Barry Gooden, Jr.
(74) Attorney, Agent, or Firm — Garvey, Smith & Nehrbass, Patent Attorneys, L.L.C.; Seth M. Nehrbass; Julie R. Chauvin

(57) ABSTRACT

A vehicle for line marking, having a steering mechanism (10) including: a directional wheel (5) that pivots about a steering shaft (12) coupled to a steering actuator (13); a control actuator (21) responsive to a steering wheel (22); and a universal joint coupling the control actuator (21) and the steering actuator (13) at a fixed angle between 20° to 70°, preferably 30° to 60°; the angle of the universal joint acting to produce a varying steering ratio as the steering wheel is moved away from its centered position. The vehicle includes a hydraulic pump circuit for a motor (101) driven line marking spray device (77) having a hydraulic supply line (105) for the motor with a check valve (107) and a high (Continued)

pressure accumulator (109) between the check valve and the motor and a pressure actuated ram (102) to deactivate the pump (100) when the pressure exceeds a threshold; the motor return line having a low pressure accumulator (110) and a restricted (112) bypass line (111).

8 Claims, 13 Drawing Sheets

(51) Int. Cl.

| | | |
|---|---|---|
| *B62D 3/02* | (2006.01) | |
| *E01C 23/22* | (2006.01) | |
| *F04B 11/00* | (2006.01) | |
| *B05B 13/00* | (2006.01) | |
| *A63C 19/06* | (2006.01) | |
| *B60K 26/02* | (2006.01) | |

(52) U.S. Cl.
CPC ............... *B62D 1/16* (2013.01); *B62D 3/02* (2013.01); *E01C 23/22* (2013.01); *F04B 11/0008* (2013.01); *A63C 2019/067* (2013.01); *F15B 2211/20553* (2013.01); *F15B 2211/20576* (2013.01); *F15B 2211/613* (2013.01); *F15B 2211/625* (2013.01); *F15B 2211/7058* (2013.01)

(58) Field of Classification Search
USPC ................................. 280/261; 180/425, 430
See application file for complete search history.

(56) References Cited

U.S. PATENT DOCUMENTS

| | | | | |
|---|---|---|---|---|
| 3,163,253 | A | * 12/1964 | Gibson | .................... B60K 1/00 180/425 |
| 4,367,881 | A | * 1/1983 | Williams | ................. B62D 7/02 114/160 |
| 5,598,897 | A | * 2/1997 | Sugiura | .................. B62D 1/163 180/417 |
| 6,349,966 | B1 | * 2/2002 | Hutter | ..................... B62D 1/16 280/771 |
| 6,361,074 | B1 | * 3/2002 | Nonaka | .................. B62D 1/197 180/271 |
| 7,159,903 | B2 | 1/2007 | Huang | |
| 7,690,685 | B2 | 4/2010 | Sasaoka | |
| 9,315,197 | B1 | * 4/2016 | Diaz-Jimenez | ........ B60W 50/10 |
| 2010/0025949 | A1 | * 2/2010 | Snow | ..................... A01D 34/64 280/93.51 |
| 2014/0167375 | A1 | * 6/2014 | Stark | ......................... B62D 3/00 280/86.751 |
| 2014/0175779 | A1 | * 6/2014 | Stark | ...................... A01D 34/66 280/771 |
| 2014/0217691 | A1 | * 8/2014 | Zeinar | ...................... B62D 1/16 280/93.5 |
| 2016/0304115 | A1 | * 10/2016 | Ning | ......................... B62D 1/16 |
| 2017/0057541 | A1 | * 3/2017 | Bodtker | ................... B62D 1/20 |

FOREIGN PATENT DOCUMENTS

| | | |
|---|---|---|
| FR | 2649452 A1 | 1/1991 |
| GB | 783187 A | 9/1957 |

* cited by examiner

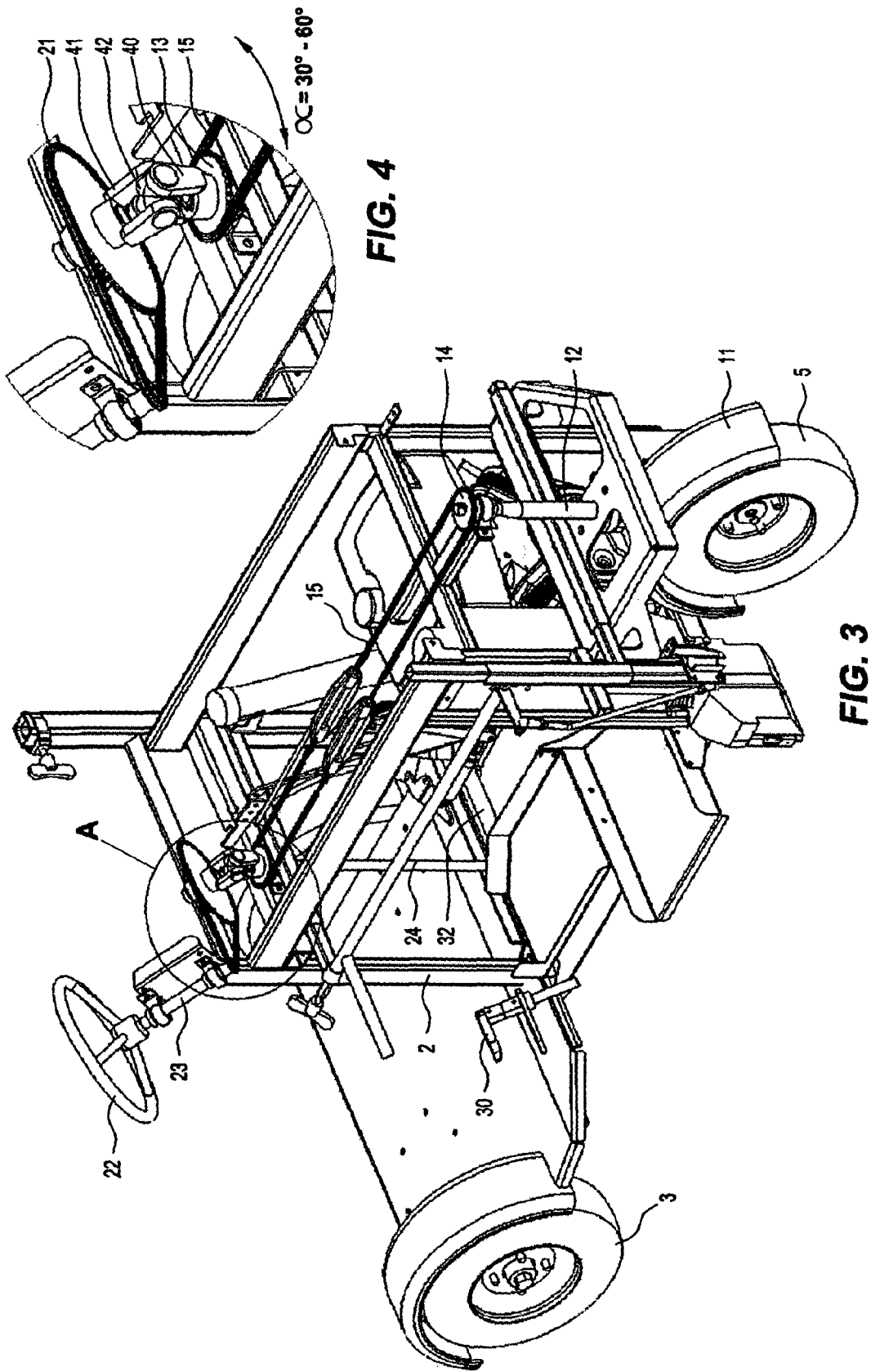

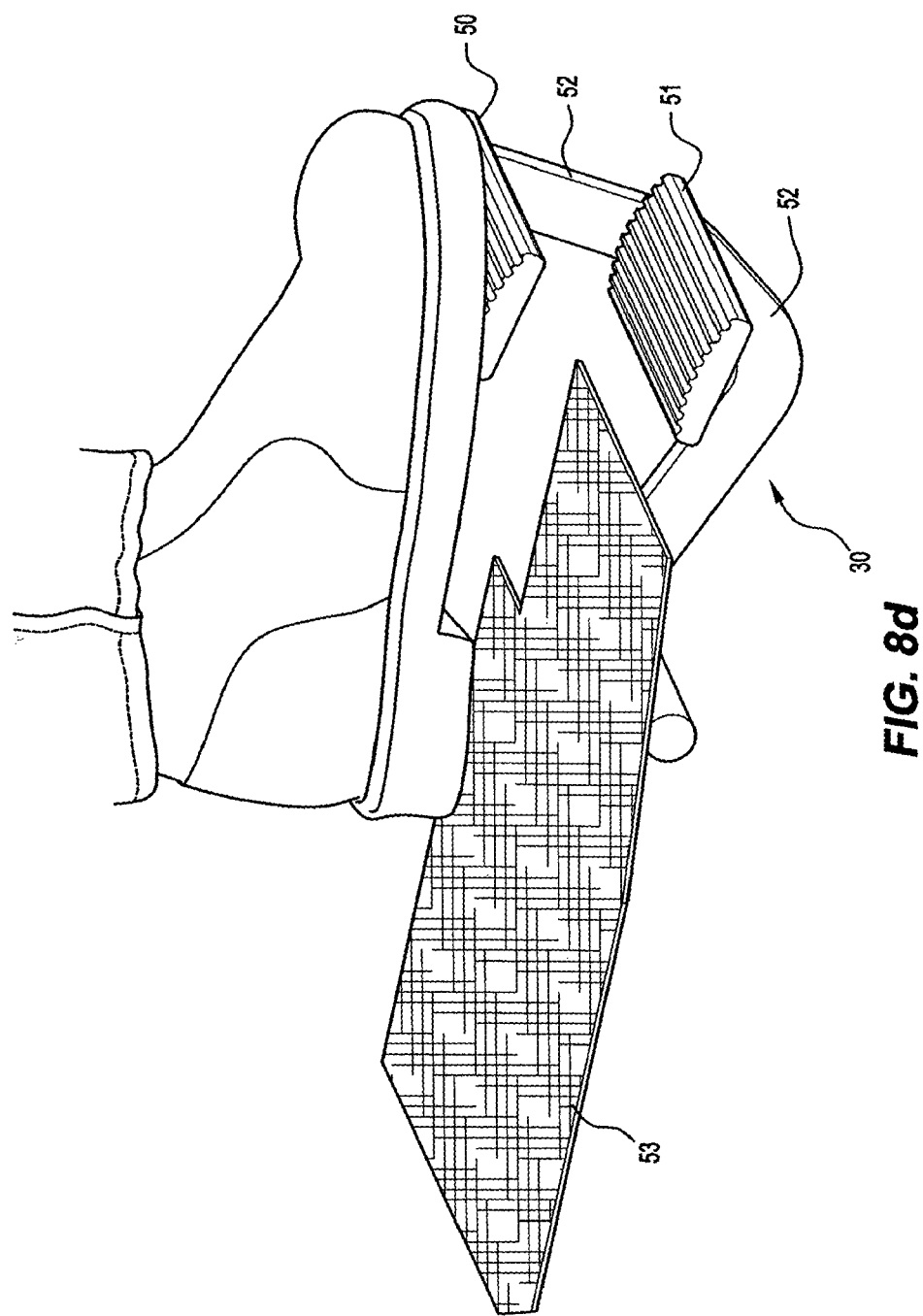

VEHICLE FOR LINE MARKING

FIELD OF THE INVENTION

This invention relates to vehicle particularly suitable as an apparatus for applying markings to surfaces such as roads, sports playing surfaces, car parks and other areas where permanent or temporary markings are desired. These types of apparatus are herein referred to as line marking apparatus.

BACKGROUND OF THE INVENTION

In order to meet a market for line marking apparatus, three different types of apparatus have been developed. Two of these types of line marking apparatus are large self-propelled machines that are used for big areas and the fast marking of roads. The largest of these are based on conventional trucks that are modified to carry over a thousand liters of paint and cover large distances. These apparatus are useful for roads with wide radius bends and are able to mark such roads quickly without reloading or stopping.

The second type are a little smaller and more manoeuvrable. It generally weighs over a tonne and is suitable for areas such as large car parks and sports fields with tighter radius bends but unrestricted access.

The third type which is most closely related to the invention, are small hand pushed machines that are used mainly for detail work around intersections or indoor painting. They are often set up with a second paint gun that can be used freehand for features that are not suited to being painted as a continuous line. An example, the second paint gun would be used to paint the arrows at intersections. This type of work is usually done with a stencil.

These third types of apparatus need to be light to be easily pushed by the operators. The weight of the machines is substantial because of the weight of the engine, the pump, the paint as well as the wheels and frame. These types of apparatus typically weigh around 100 kg. This is a substantial weight which needs to be pushed by the operator and over time places a great physical strain on the operator. It is particularly difficult for smaller operators on steep terrain or surfaces which offer more resistance such as grass on sports fields.

Manufacturers to date have addressed this by adding propulsion systems to existing hand pushed machines. This is an easy way of making these machines, more versatile. However by simply adding a propulsion unit to an existing hand push design results in an apparatus which has limited manoeuvrability. This results in an apparatus being unable or unsuitable to perform the detail work that is the main function and advantage of these small machines. The detail work generally can only be done by removing the propulsion unit and pushing the apparatus around the small areas.

The object of the present invention is to produce an apparatus which is manoeuvrable enough to do the most detail of line work and directionally stable enough to paint longer straight lines.

The applicants found that if a direct ratio steering system was used to control the directional wheel, then in the modes of operation, namely straight line marking or small radius cornering, direct ratio steering created a problem in that the steering was too fast when driving in a straight line and at the same time too slow when turning sharply. Therefore it is desirable to have a steering system which was able to retain fast steering for manoeuvring in tight spaces but have stability for straight lines.

This is addressed by a variable ratio steering system which enables the directional wheel to be able to rotate as much as 200° (ie 100° either side of straight line alignment) with the rate at which the directional wheel rotates increasing the further the wheel is rotated away from the straight line alignment.

The applicants have achieved this by using a single universal joint between the primary steering mechanism and the secondary steering mechanism. By inclining the actuator wheel of the primary steering mechanism steering wheel at an angle to the steering sprocket of the secondary steering mechanism back towards the operator, the natural operation of the universal joint to alter the speed at which two shafts turn relative to each other as the universal joint rotates can be utilised to give the effect of producing a small rotation of the directional wheel when a rotation is applied to the steering wheels effectively producing a slow rotation when the directional wheel is substantially pointed straight ahead, and producing a larger rotation when the same corresponding rotation is applied when the directional wheel is rotated out of away from the straight ahead alignment. This has the effect of speeding the steering up when turning sharply either left of right without restricting steering angle.

SUMMARY OF THE INVENTION

A vehicle comprising a frame, wheels supporting the frame, at least one of the wheels being a directional wheel which determines the direction of movement of the vehicle, and a steering mechanism including a mounting for the directional wheel, the mounting including a steering shaft having an axis about which the directional wheel rotates to direct the direction of movement of the apparatus, the steering shaft being coupled to a steering actuator whereby rotation of the steering actuator produces a corresponding rotation of the steering shaft; an control actuator responsive to an operator control device; and a universal joint providing mechanical engagement between the control actuator and the steering actuator, the axis of rotation of the control actuator being at an angle of 20° to 70°, preferably 20° to 60° and more preferably 30° to 60° to the axis of rotation of the steering actuator, the control actuator having a first alignment corresponding to all wheels including the directional wheel being aligned, whereby rotation of the control actuator produces a variable rotation of the steering actuator depending on the rotation of the control actuator away from the first alignment. The applicants found that if a direct ratio steering system was used to control the directional wheel, then in the modes of operation, namely straight line marking or small radius cornering, direct ratio steering created a problem in that the steering was too fast when driving in a straight line and at the same time too slow when turning sharply. Therefore it is desirable to have a steering system which was able to retain fast steering for manoeuvring in tight spaces but have stability for straight lines.

This is addressed by a variable ratio steering system which enables the directional wheel to be able to rotate as much as 200° (ie 100° either side of straight line alignment) with the rate at which the wheel rotates reducing the further the wheel is rotated away from the straight line alignment.

The applicants have achieved this by using a single universal joint between a primary steering mechanism and the secondary steering mechanism. By inclining the actuator wheel of the primary steering mechanism steering wheel at an angle to the steering actuator of the secondary steering mechanism back towards the operator, the natural operation of the universal joint to alter the speed at which two shafts turn relative to each other as the universal joint rotates can be utilised to give the effect of producing a small rotation of the directional wheel when a rotation is applied to the steering wheel effectively producing a slow rotation when the directional wheel is substantially pointed straight ahead, and producing a larger rotation when the same corresponding rotation is applied when the directional wheel is rotated out of away from the straight ahead alignment. This has the effect of speeding the steering up when turning sharply either left of right without restricting steering angle.

In a further aspect there is provided a steering mechanism including
- a mounting for the directional wheel, the mounting including a steering shaft having an axis about which the directional wheel rotates to direct the direction of movement of the apparatus, the steering shaft being coupled to a steering actuator whereby rotation of the steering actuator produces a corresponding rotation of the steering shaft;
- an control actuator responsive to an operator control device; and
- a universal joint providing mechanical engagement between the control actuator and the steering actuator, the axis of rotation of the control actuator being at an angle of 20° to 70° to the axis of rotation of the steering actuator, the control actuator having a first alignment corresponding to all wheels including the directional wheel being aligned,
- whereby rotation of the control actuator produces a variable rotation of the steering actuator depending on the rotation of the control actuator away from the first alignment.

Another development of the applicants relates to a system of powering and driving the linear paint motor of a smaller line marking apparatus using closed centre variable displacement pumps. By utilising a closed centre variable displacement pump to drive the paint motor, an efficient hydraulic system can be used. The hydraulic circuit may also be easily adapted to power a second motor which can be used to drive the propulsion unit to drive the wheels of the apparatus. In another aspect of the invention, there is provided an hydraulic pump circuit comprising: a closed centre variable displacement pump hydraulically connected to a linear motor driven spray device, the hydraulic circuit comprising: an hydraulic supply line to the hydraulically driven linear motor; an hydraulic return line to the pump; a reservoir for hydraulic fluid; and a charge pump providing hydraulic fluid from the reservoir to maintain the volume of hydraulic fluid in the circuit; characterised in that the supply line including a check valve and a high pressure accumulator between the check valve and the linear motor of the spray device to dampen pressure fluctuations in the supply line and a pressure actuated ram responsive to deactivate the pump upon pressure at the linear motor exceeding a preset value; and the return line including a low pressure accumulator to dampen fluctuations in the return line and a bypass line to return excess hydraulic fluid to the reservoir; the bypass line being provided with a restrictor preferably adjustable to control the flow of excess hydraulic fluid to the reservoir.

The hydraulic circuit may further comprise a second circuit comprising a second closed centre variable displacement pump hydraulically connected to a drive motor for at least one wheel of the apparatus described above.

BRIEF DESCRIPTION OF THE DRAWINGS

FIG. 3 is a perspective view of the apparatus of FIG. 1 from above;

FIG. 4 is an exploded view of section A of FIG. 3;

FIGS. 8a, 8b, 8c, 8d are schematic diagrams showing operation of the accelerator according to an aspect of the invention.

DETAILED DESCRIPTION OF THE EMBODIMENTS

Figure 1:
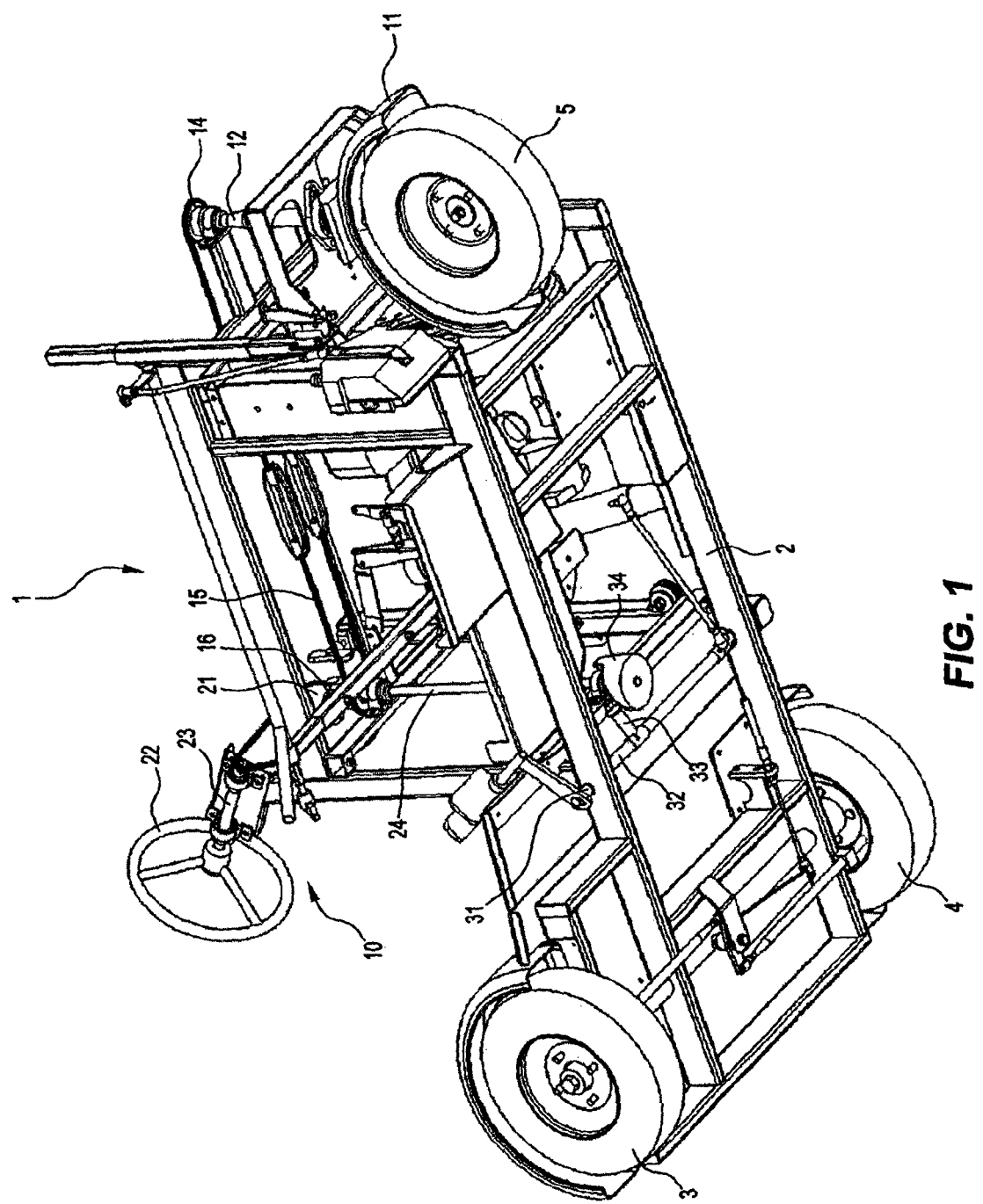
FIG. 1 is a perspective view from below of the a partially assembled line marking apparatus.
Figure 2:
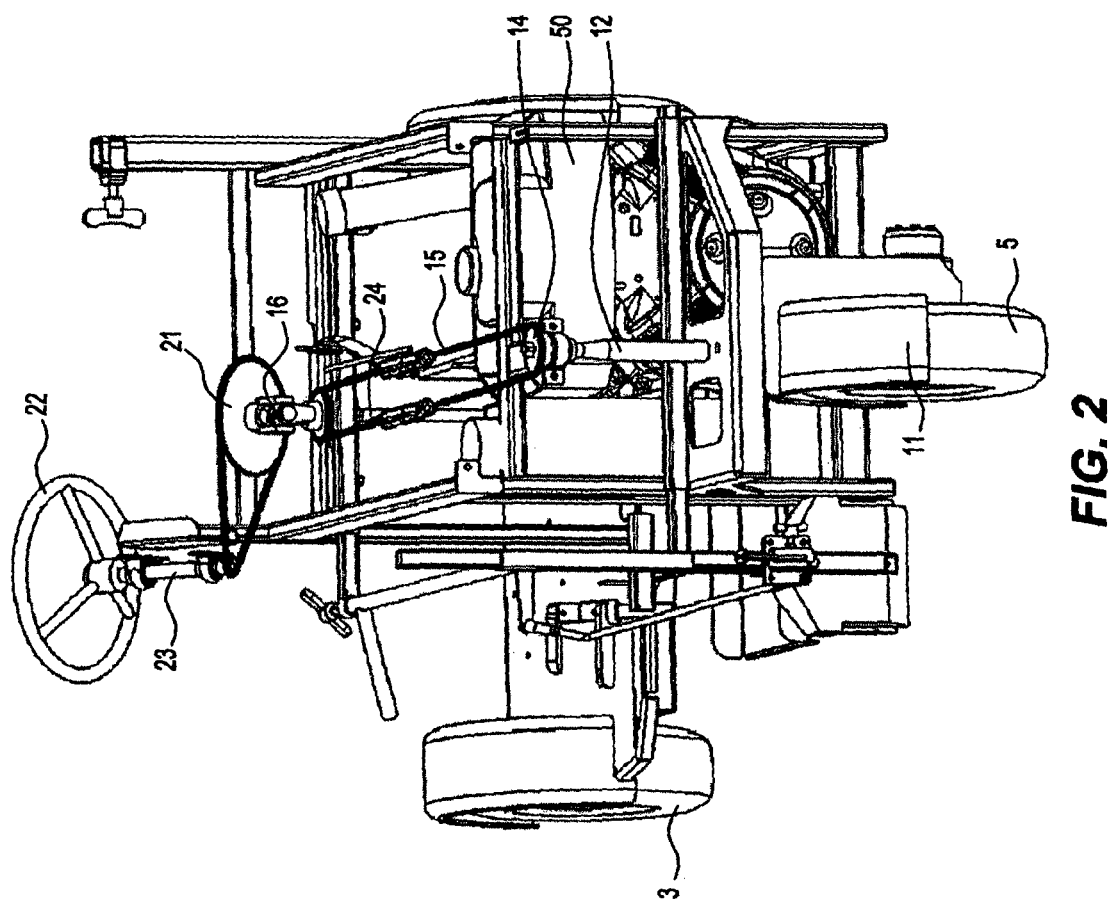
FIG. 2 is a front perspective view of the apparatus of FIG. 1.
Figure 5:
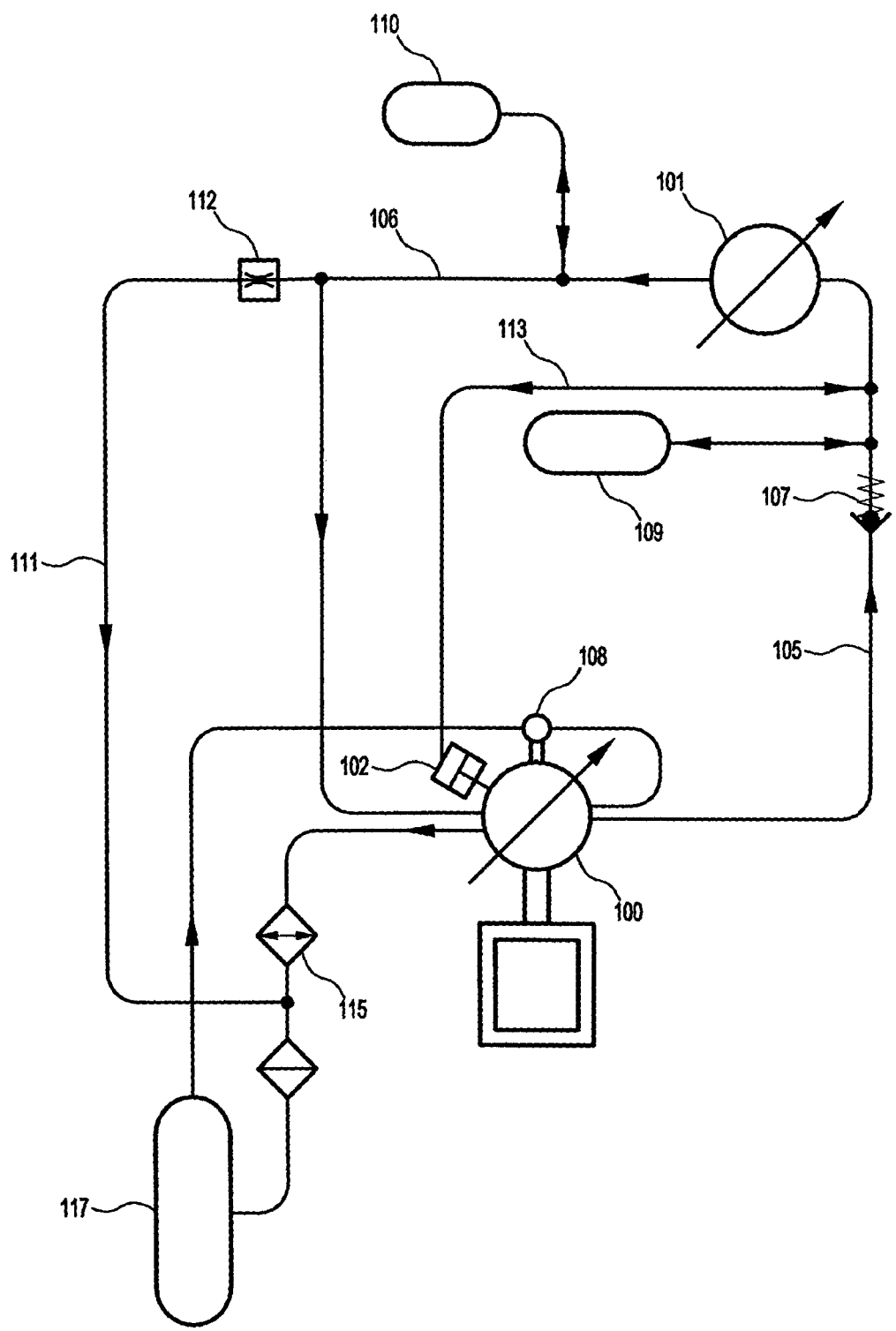
FIG. 5 is a schematic diagram of the paint motor hydraulic circuit.
Figure 6:
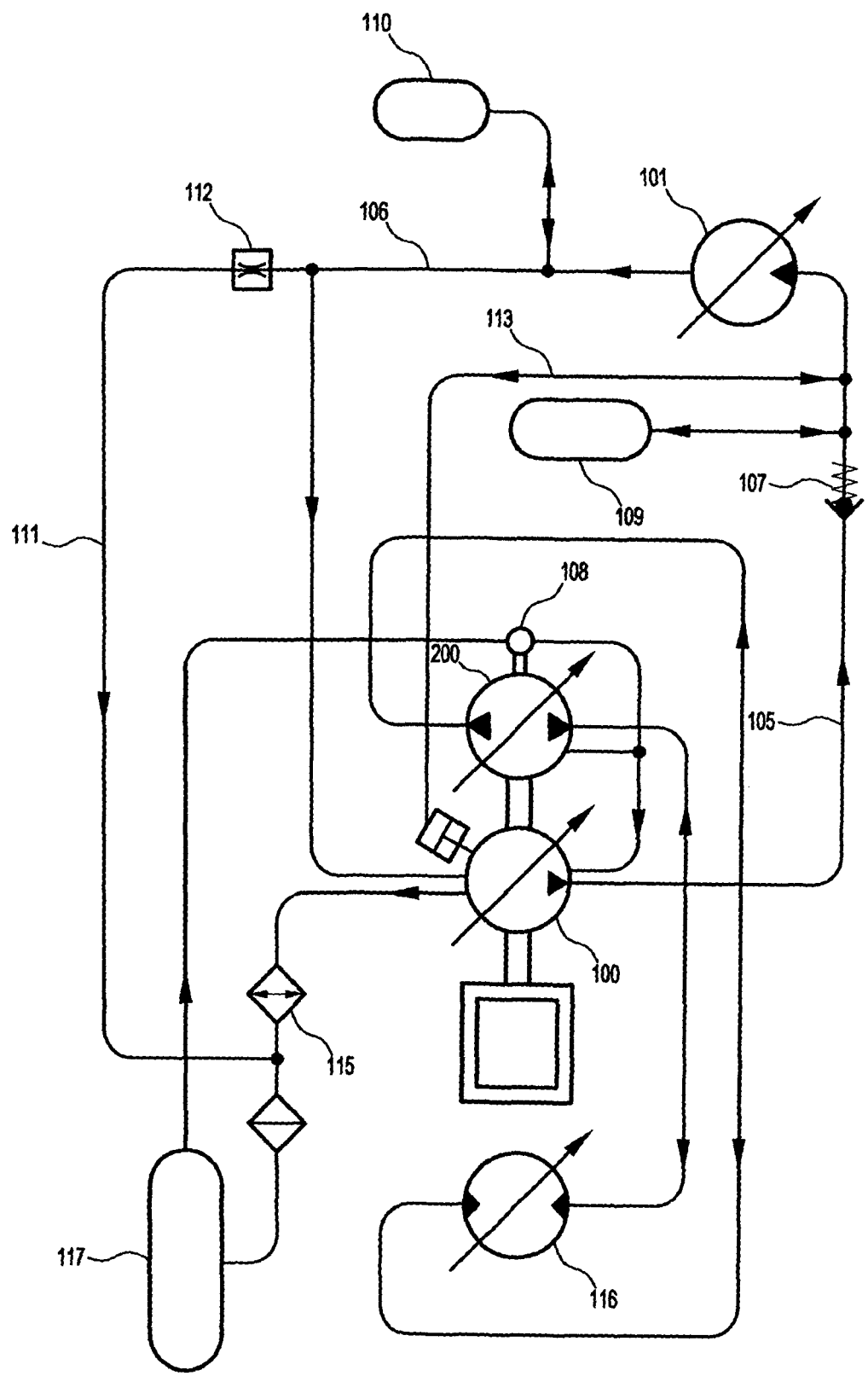
FIG. 6 is schematic diagram of the circuit of FIG. 6 with the drive motor hydraulic circuit.
Figure 7:
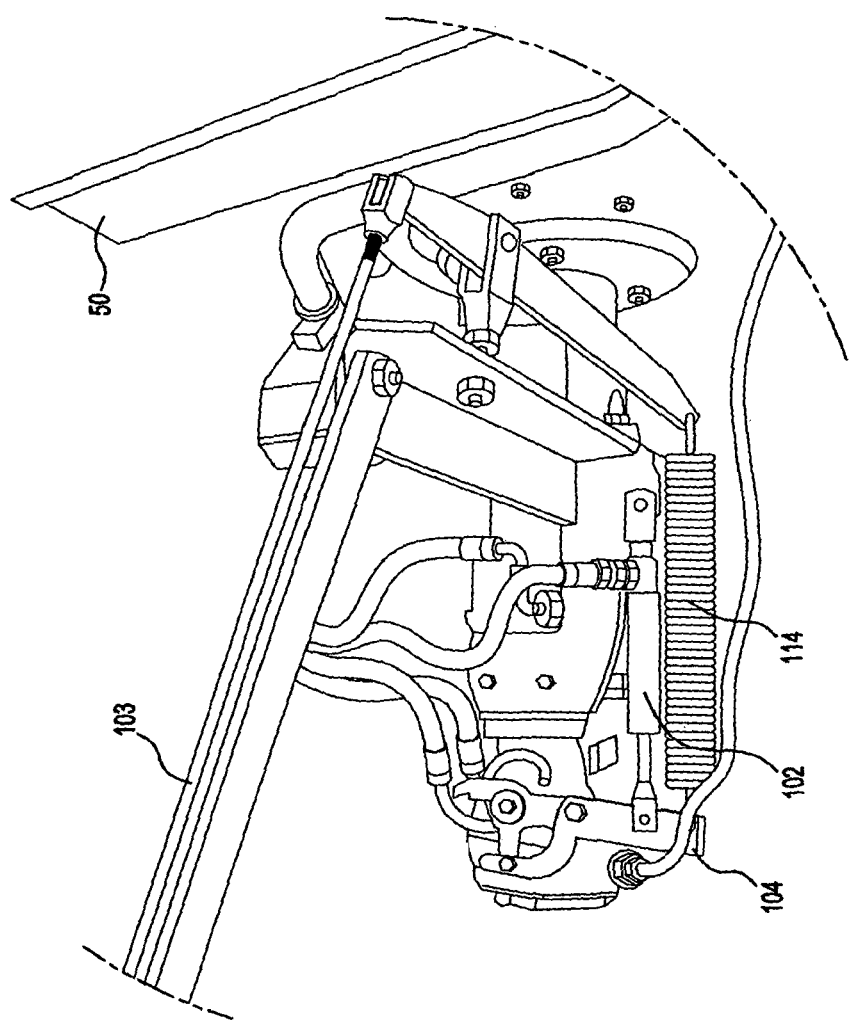
FIG. 7 is a partial view of the pump motor assembly.

It will be understood that the invention disclosed and defined in this specification extends to all alternative combinations of two or more of the individual features mentioned or evident from the text or drawings. All of these different combinations constitute various alternative aspects of the invention.

Referring to the drawings, the apparatus 1 according to one embodiment includes a frame 2, and wheels 3, 4, 5 supporting the frame 2. At least one of the wheels 5 is a directional wheel which determines the direction of movement of the apparatus 1. The apparatus includes a steering mechanism 10 including a primary and secondary steering mechanism. The primary steering mechanism including a mounting 11 for the directional wheel 5, the mounting 11 including a steering shaft 12 having an axis about which the directional wheel 5 rotates to direct the direction of movement of the apparatus. The steering shaft 12 is coupled through a shaft actuator to a steering actuator both of which may be in the form of a corresponding wheel or sprocket whereby rotation of the steering actuator 13 produces a corresponding rotation of the shaft actuator 14. As the shaft actuator is preferably fixed onto steering shaft 12, and the steering shaft and shaft actuator are axially aligned, rotation of the steering shaft 12 corresponds to rotation of the shaft actuator.

In the embodiment shown, this corresponding rotation between the steering actuator 13 and the shaft actuator 14 is provided by a linkages, chain or belt drive 15 cooperating between a shaft sprocket 14 and steering actuator 13. Thus there is proportional rotation of the shaft actuator relative to the steering actuator 13. Depending on the size of the respective actuator wheels or sprockets, and particularly the ratio of respective diameters, the respective rates of rotation of the actuators will correspond to the diameter ratios of the actuators, thus providing a proportional reduction or increase in the rate of rotation of the steering actuator 14 relative to the shaft actuator and steering shaft 12. The steering actuator 13 is engaged with a universal joint 16.

The secondary steering mechanism includes a control actuator 21 which may be in the form of a wheel or sprocket responsive to an operator control device such as a steering wheel 22. The steering wheel is mounted in a fixed position on the frame for rotation on a steering column shaft 23 having about an axis. The steering column shaft mechanically cooperates or engages with the control actuator 21 preferably by means of a cog at the end of the steering column shaft 23 engaging through a column actuator in the form of a groove or guide channel in the shaft with a chain or belt which in turn engages the control actuator 21. The universal joint provides mechanical engagement between the control actuator 21 and the steering actuator 13, the axis of rotation of the control actuator being at an angle of 30° to 60° to the axis of rotation of the steering actuator or sprocket 21. The control actuator has a first alignment corresponding to all wheels including the directional wheel being aligned. In operation, rotation of the control actuator 21 produces a variable rotation of the steering actuator 13 depending on the rotation of the control actuator away from the first alignment.

As shown in FIG. 4, the universal joint comprises a first U shaped mount 40 having the base of the U fixed to the steering actuator 13 at the centre of rotation of the steering actuator 13 and a second U-shaped mount 41 fixed to the centre of rotation of the control actuator 21. The first and second U-shaped mounts 41, 40 are each provided with hinge pins which cooperate with the corresponding hinge pin through a common connection body 42. The axis of the hinge pins is orthogonal through the common connection body 42. Universal joints also known as Cardan joints have the characteristic in that even when the input drive shaft axle rotates at a constant speed, the output drive shaft axle rotates at a variable speed. The variation in the speed of the driven shaft depends on the configuration of the joint and particularly the respective angles of rotation of the respective axles.

In the application to the present invention, a constant rotation of the operator controlled steering wheel and control actuator 21 of the second steering mechanism provides a variable rotational output of the steering actuator 13 and a corresponding rotation of the directional wheel of the primary steering system.

The applicants found that if a direct ratio steering system was used to control the directional wheel, then in the modes of operation, namely straight line marking or small radius cornering, direct ratio steering created a problem in that the steering was too fast when driving in a straight line and at the same time too slow when turning sharply. Therefore it is desirable to have a steering system which was able to retain fast steering for manoeuvring in tight spaces but have stability for straight lines.

This is addressed by the above described variable ratio steering system which enables the directional wheel to be able to rotate as much as 200° (ie 100° either side of straight line alignment) with the rate at which the directional wheel rotates reducing the further the steering wheel is rotated away from the straight line alignment.

The addition of the universal joint results in movement of the steering wheel having a greater effect on the directional wheel the further it is turned from the straight ahead alignment of the universal joint. Thus the alignment of the universal joint is a highly preferred aspect of the invention. In order to get the "timing" of the universal joint correct, the axis of the two bearing cups (U-shaped mounts) attached to the primary steering mechanism and secondary steering mechanisms must be in line with the direction of forward travel towards the directional wheel 5. As shown in FIG. 4, initially, the axis of the hinge pin, attached to the steering actuator is aligned in the direction of travel, particularly in the straight line direction of travel. The axis of the hinge pin of the control actuator is a aligned orthogonal to the axis of the hinge pin of the steering actuator through the connection body 42 giving it an alignment which is initially perpendicular to the direction of travel. This ensures that the degree of turn of the steering wheel to either side needed to turn the directional wheel 5 is the same in both directions of turn. Additionally a 90 degree rotation to in a clockwise direction will result in the same degree of turn in the opposite direction as a 90 degree turn to in a counter-clockwise direction.

As the preferred configuration of vehicle is a three wheeled vehicle, sharp steering provided by the above steering system presented a stability problem when the vehicle was moving at a speed normally associated with straight line marking and a turn was required. This is a particular problem with inexperienced operators on uneven surfaces. To reduce the problem the applicants further developed an a accelerator (speed) control to the steering mechanism so that the speed of the machine is automatically reduced as the steering approaches full lock. Ideally this overrides an operator's input to go too fast in a situation that could result in a roll over.

The propulsion of the vehicle or apparatus is provided by a drive motor which will be described in greater detail below. The speed of the apparatus is controlled by the operator using a pedal 30 which is engaged with the power supply to speed up or slow down the ground speed of the vehicle or apparatus. The pedal 30 is mounted for rotation to the frame 2 about a pivot axis 31, preferably provided by a control rod 32. In a preferred form of the invention, the steering sprocket 13 is mounted to a shaft 24 which is provided with a cylindrical contoured cammed wheel 34 which rotates with the sprocket 13 on shaft 24. The cammed wheel 34 engages with a fixed extension on the control rod 33 which limits pivotal movement of the control rod 32. As the steering sprocket 13 rotates about shaft 24 corresponding to the directional wheel and the vehicle turning, the cam engages the control rod, to rotate the control rod forcing the pedal to pivot back towards the operator. This has the effect of reducing the travel of the pedal, reducing the power from the propulsion unit and slowing the vehicle. This provides a governing system which reduces the risk of the vehicle turning too quickly while under power and toppling over.

One aspect of the invention is the ability of the apparatus to turn at right angles. In addition to the steering mechanism described above it is also desirable to mount the propulsion motor directly to the directional wheel or wheels that steer the machine. This allows the directional wheel(s) to turn through 160 degrees and more on a substantially vertical axis. The preferred form of propulsion is hydraulic which will be described in greater detail below. However it is apparent to those skilled in the art that the design would lend itself to electric motors or mechanical drive if the power was to be sent via a shaft through the centre of the steering axis of the wheel(s) then through a right angle drive. This arrangement would be more complex but may be more efficient in a larger version of the machine designed for larger jobs. The nature of the work that line marking vehicles perform falls into two main functions; namely painting and travelling. The painting function requires the speed of the apparatus to be controlled precisely to get optimum paint coverage; too quickly and the paint goes on too thinly and too slowly and the paint goes on too thickly which wastes paint and can even adversely affect the life of the paint by increasing drying times and thickness.

Figure 8A:
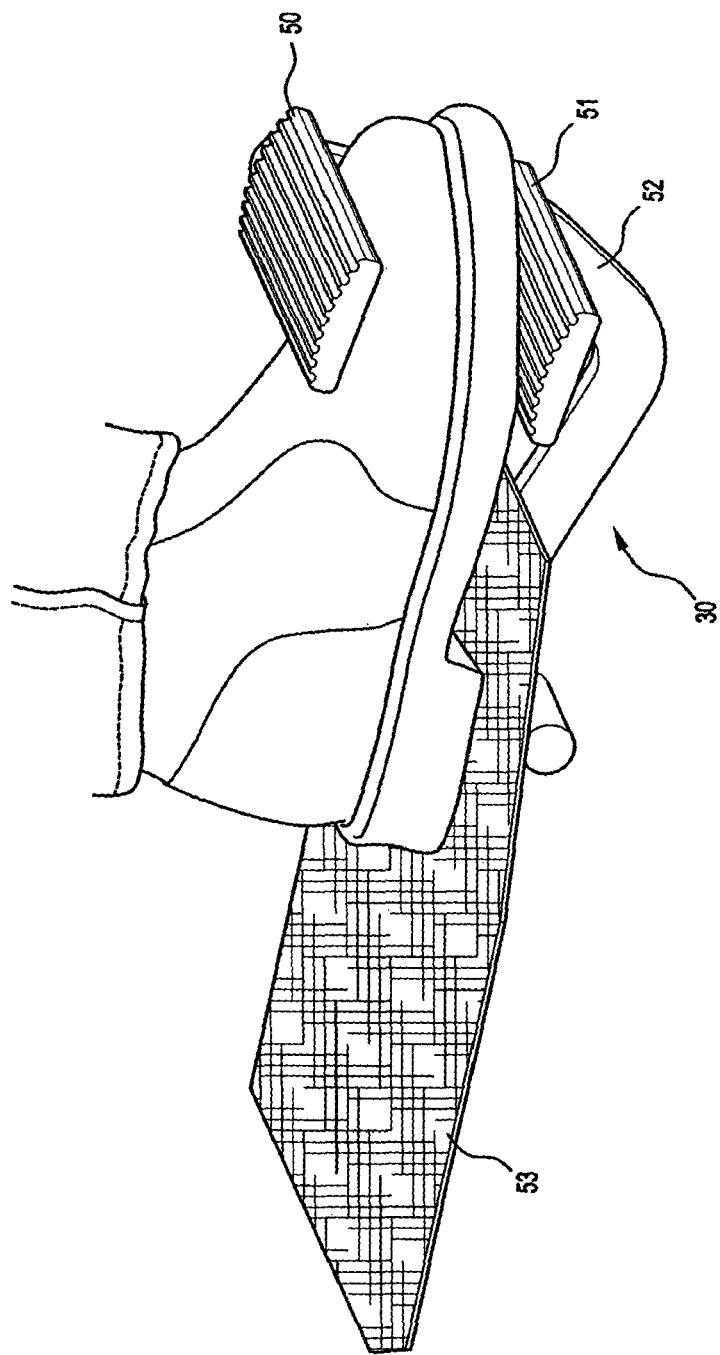
Figure 8B:
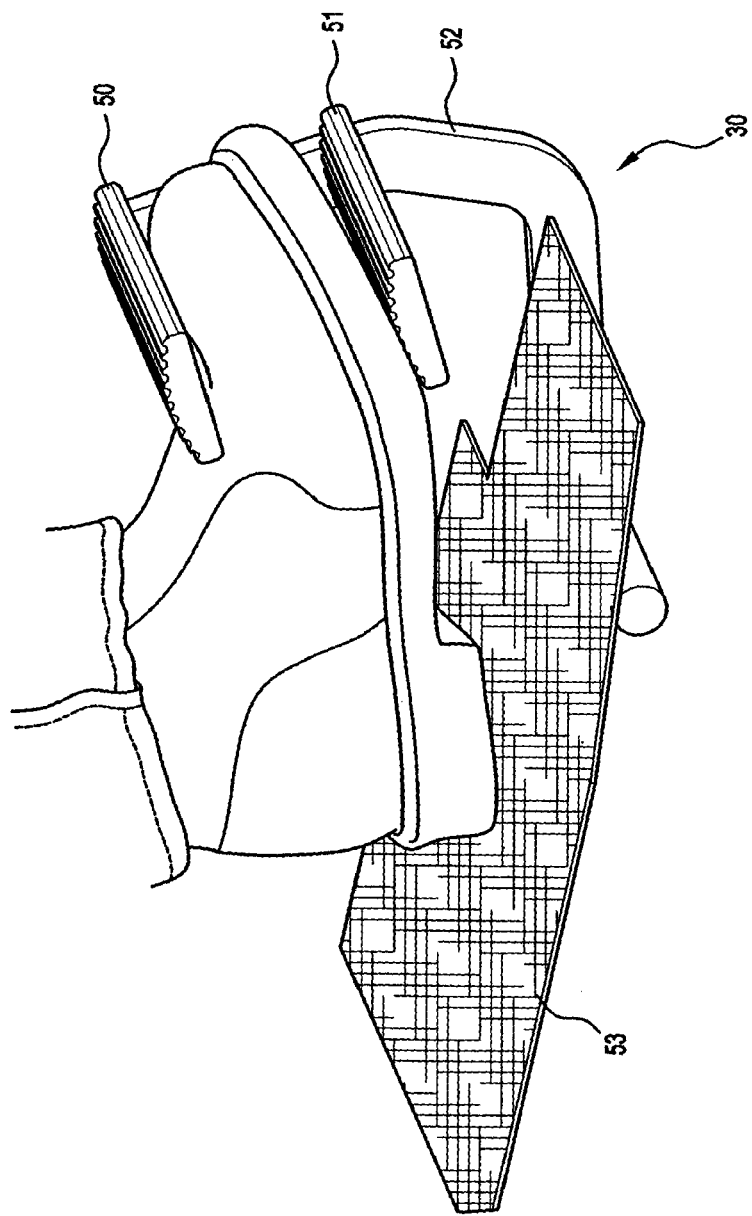
Figure 8C:
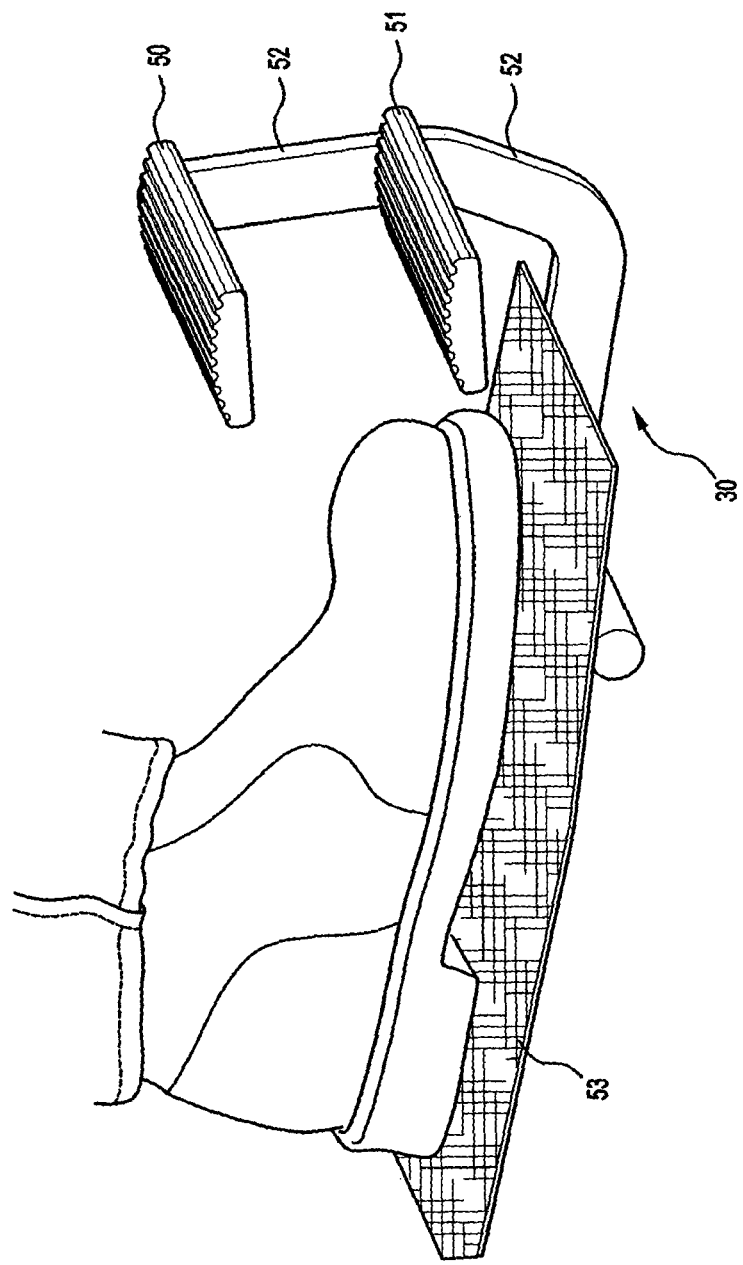
Figure 9:
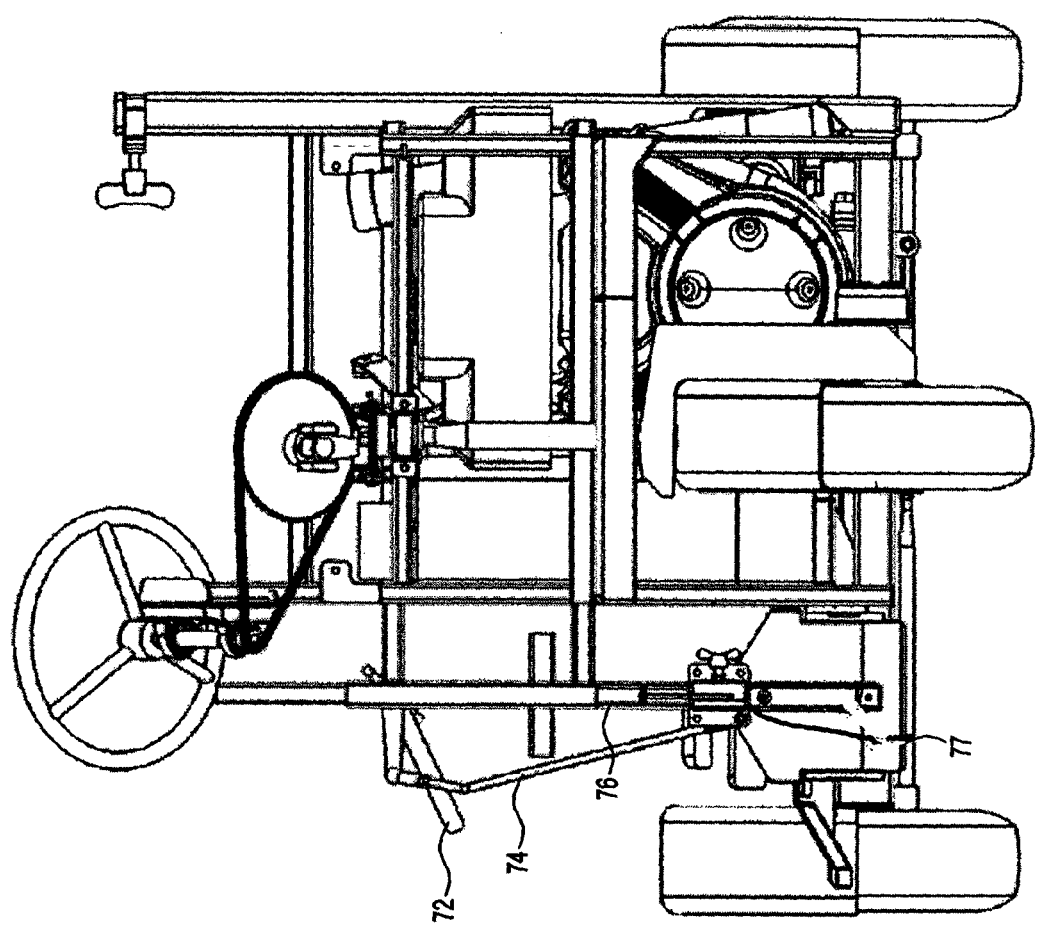
FIG. 9 is a front view of the line marking vehicle illustrating the paint spray nozzle control.
Figure 10:
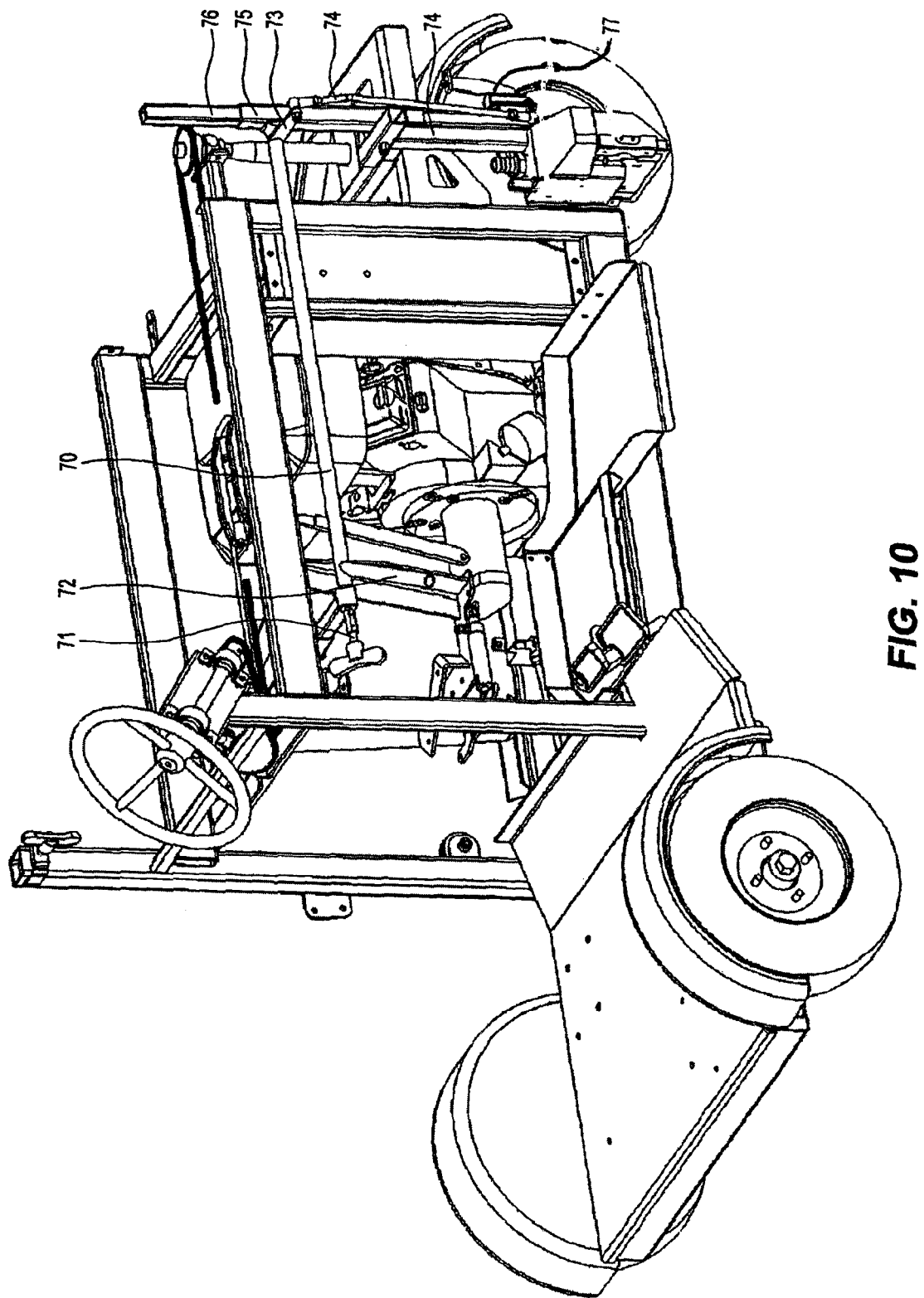
FIG. 10 is a side view of the line marking vehicle illustrating the paint spray nozzle control.
Figure 11B:
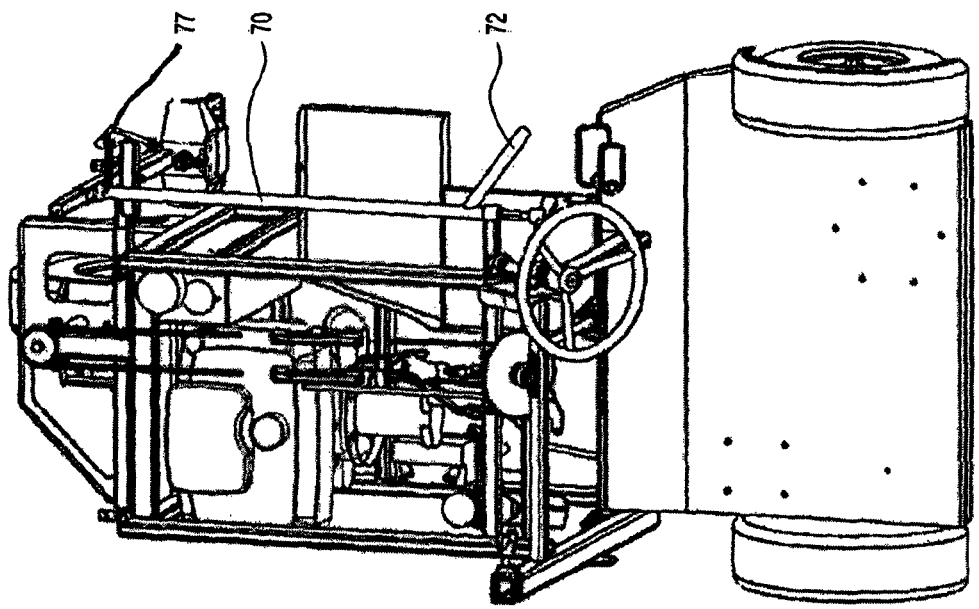
FIGS. 11(a) and 11(b) are respectively a perspective view and top view of the line marking vehicle illustrating the paint spray nozzle control.
Figure 11A:
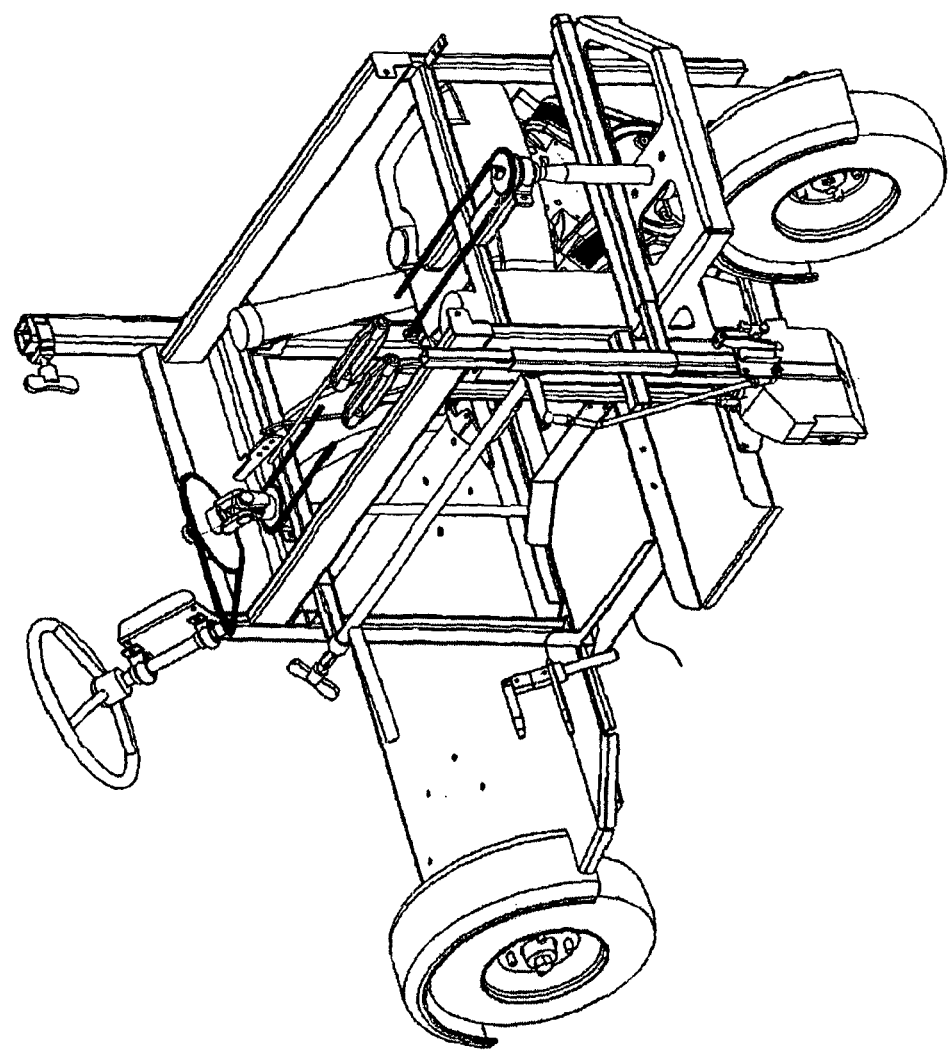

A further aspect of the invention provides a throttle control for a vehicle comprising a pivotally mounted accelerator pedal 30, a proportional actuator responsive to pivotal movement of the accelerator pedal between a first position and a full range position. This aspect also relates to an accelerator pedal for use with a vehicle. The accelerator pedal 30 (FIGS. 8c and 8d) includes a first engagement position 50 which permits the operator to apply the full range of pivotal motion to the floor of the vehicle and a second engagement position 51 which permits the operator less than the full range of pivotal motion. The accelerator pedal 30 is preferably a lever arm 52 pivotally mounted at a first end to a throttle mount. The first engagement position 50 is at the second end of the lever arm distal to the throttle mount (not shown) and the second engagement position 51 is intermediate the throttle mount and the first engagement position 50.

For vehicles of this type, the speed of the apparatus can be controlled by a foot operated accelerator pedal 30. Under a typical arrangement, a foot operated accelerator pedal urges the apparatus to full speed when the accelerator pedal is fully depressed. This is the case with the accelerator pedal of the applicant however by adding a second accelerator pedal at a second engagement position, under the first engagement position and providing a well or opening in the floor of the vehicle allowing it to travel past the foot plate and into the well when the accelerator pedal is fully depressed from the first engagement position allows for a second travel position. The second engagement position between the first engagement position and the mount of the accelerator pedal is in a portion that the operator can instantly find, simply by putting his foot on the lower accelerator pedal and pushing it through a limited range of motion to the floor of the vehicle. Having the second engagement position approximately two centimeters from the end of the foot plate or floor allows for small incremental adjustments. The range of motion from the second engagement position may be adjusted by moving the second engagement position towards the first engagement position to allow for different speeds required for differing width lines and vehicle speeds.

Having the two accelerator pedals one above the other and far enough apart to allow for the operators foot to fit between the two allows for a second purpose. The infinitely variable pump used in one aspect of the invention is also reversible. The linkage may be designed so that raising it above a detent that holds it in the neutral position (See diagram 8a and 8b) will make the machine reverse without the need for extra controls. This is advantageous where a frequent change of direction is expected thus making the machine more productive.

There is a requirement for the apparatus to travel faster than painting speed when travelling between jobs or more often just between lines. The top accelerator pedal works like a conventional accelerator in this mode of travel.

A further aspect of the invention is the means to operate the paint gun on the line marker or line striper. The width of a line produced by a machine can be adjusted by three basic methods. The first two involve either replacing the tip with one having a different spray fan angle or by rotating the tip to increase or reduce the width of the line. The tips produce a flat oval shape spray and are normally operated with the longest dimension of the oval at right angles to the travel direction of the line marker. The width of the line can thus be adjusted. The tips are also available in a variety of orifice sizes and spray angles. The greater the size of the orifice the greater the amount of paint per hour and hence the faster a machine can travel and still deliver enough paint to produce the right paint thickness. The tips are also available in differing spray angles, the greater the angle the wider the line produced given a fixed height off the surface. Neither of these options is all that convenient for making fast adjustments to the width of a line. The easiest and most common method is to raise and lower the paint gun on a largely vertical shaft and have it clamped in position. This has been the standard method for a number of years however even this method has its short comings. Because atmospheric conditions, paint temperature and paint type all play a role in determining the width of spray coming out of given tip there is always slight adjustments to achieve the width of line required. This often means setting the height of the gun making a test spray measuring the width produced then making fine adjustments either up or down to achieve the desired line width. The paint gun is normally mounted at the opposite end of the machine to the operator and this can lead to a lot of walking back and forward to adjust the width of the line.

The apparatus to control the operation of the paint spray nozzle according to an embodiment of one aspect of the invention is shown in FIGS. 9, 10, 11(a) and 11(b). To make line width adjustment more convenient we have devised an apparatus and method to make the adjustment from the operator's position.

To achieve this, the gun (not shown) is placed on a bracket 77 mounted to shaft 76 then goes through a sleeve 75. The bracket 77 is operated by a threaded bolt 71 extending back to the operator position. Around this bolt, a tube 70 is placed that has a handle 72 mounted at the operator's end. This handle 72 is mounted at close to right angles to the tube 70. On the paint gun end of the tube is a lever 73 at right angles to the tube 70. At the end of this lever 73 is a linkage 74, the linkage 74 joins the lever 73 to the paint gun so that when the handle 72 makes the tube 70 rotate, the paint gun (not shown) on the bracket 77 is either raised or lowered depending on the operators desire to make the line wider or narrower. The gun can then be locked in place by the extended bolt and bracket. Additionally the linkage 74 allows for the gun to be held in its raised position without the need to lock the clamp. This is achieved by having the linkage 74 go over centre when the paint gun is in the fully raised position. This improves ease of operation as well as making the machine safer by removing the need to get off and on the machine.

In a further aspect of the invention, there is provided an hydraulic system to drive a paint pump preferably using a variable displacement closed centre pump. Machines of the size contemplated by the applicant mainly use small fast stroking piston pumps which have taken over from earlier diaphragm style pumps. Both these designs run at high speed and are prone to high wear and difficulties in priming, high frequency pulsing and a tendency for check valves to block with paint are common problems.

The latest designs are using hydraulic driven paint pumps that have a similar paint piston to the faster stroking piston pumps (displacement pumps). The piston on the new hydraulic driven machines is driven up and down by a linear hydraulic motor; the motor is drive by an open centre hydraulic pump. These machines supply oil to the hydraulic paint motor. When the machine is not painting the oil that would normally go to the motor is put through a bypass valve and continues to circulate. The problem with open centre pumps is that the oil is heated by this pumping and the machines require a large fan and cooling fins around the oil reservoir to dissipate the heat. This dissipated heat is waste energy.

The applicants have developed a system which utilises the same types of hydraulic motor and paint pump as current systems but employs a closed centre variable displacement hydraulic pump. The system of this aspect of the invention automatically senses when the paint stops flowing and stops the oil flow. In the preferred embodiment the pressure sensing and pump flow control is hydraulic/mechanical; however it could be done electronically. This pressure compensated system gives infinitely variable pressure and volume control.

Additionally, there is very little energy wasted through unnecessary oil pumping.

According to another aspect of the invention, there is provided an hydraulic pump circuit comprising: a closed centre variable displacement pump 100 hydraulically connected to a linear motor driven spray device 101, the hydraulic circuit comprising: an hydraulic supply line 105 to the hydraulically driven linear motor 101; an hydraulic return line 106 to the pump 100; a reservoir 117 for hydraulic fluid; and a charge pump 108 providing hydraulic fluid from the reservoir 117 to maintain the volume of hydraulic fluid in the circuit; characterised in that the supply line 105 including a check valve 107 and a high pressure accumulator 109 between the check valve 107 and the linear motor 101 of the spray device to dampen pressure fluctuations in the supply line 105 and a pressure actuated ram 102 responsive to deactivate the pump 100 upon pressure at the linear motor 101 exceeding a preset value; and the return line 106 including a low pressure accumulator 110 to dampen fluctuations in the return line 106 and a bypass line 111 to return excess hydraulic fluid to the reservoir 117; the bypass line 111 being provided with an restrictor 112 to control the flow of excess hydraulic fluid to the reservoir 117.

The closed centre variable displacement oil pumps 100 used in this aspect of the invention are activated manually by a lever 104 through the body of the pump the "slave lever". The pump 100 is engaged by pulling the lever into position with a spring. The pump 100 then pumps oil to the paint motor 101 until it is disengaged or the paint stops flowing. When the paint stops, the oil pressure increases and a small single acting hydraulic ram 102 pushes the slave lever 104 back to the neutral position. The ram 102 is mounted so that a small change in pressure produces a large movement in the slave lever 104. This is done so that the paint pressure remains constant regardless of the amount of paint being used. The cable that pulls the slave lever into position is controlled by a master lever 103 similar to that used on fork lift hand brakes. This style of lever operates by going over centre when engaged; this removes the need to hold the lever in the on position while painting. The master lever 103 also incorporates an adjusting knob that makes it convenient to make fine adjustments to the pressure of the oil and hence the paint.

High Pressure No Flow

A potential problem with operation of closed centre variable displacement pumps 100 is the inability of such pumps to maintain high pressure without delivering oil. The design of the pumps is such that they are subject to high wear rates caused by the combination of small oil flows and high pressure and temperatures that are present in the pump when maintaining pressure close to the maximum deliverable but without the oil flow that would normally cool and lubricate them. To get around this problem, the applicants we have placed a check valve 107 between the oil pump 100 and the linear motor 101 that drives the paint pump 100 so that pressure in line 107 at the linear motor 101 can remain high and hence maintain pressure on the paint without the need for pressure at the oil pump 100.

An oil line 113 tapped in between the check valve 107 and the linear motor 101 delivers this pressurised oil to the hydraulic ram 102 that controls the paint pump 100. This has the effect of shutting the oil pump 100 down once the oil pressure rises due to the operator ceasing to paint. The nature of the closed centre pumps is such that they quickly drop pressure on the delivery side once the slave lever 104 has been returned to the neutral position by the hydraulic ram 102. When the operator commences painting the pressure downstream of the check valve 107 drops, the ram 102 is compressed by the spring 114 and this reactivates the oil pump.

Inconsistent Oil Flow Return

The nature of closed centre oil pumps is such that they require close to the same amount of oil to be returned to the intake side of the pump 100 as is delivered from the outlet side. This problem is that unlike conventional pumps that take all the intake oil from a reservoir that is topped up by the oil being dumped directly to it once it has done its work, the oil going to the intake side of a closed centre oil pump comes directly to it after doing its work.

In the embodiment of the invention, a small discrepancy in the amount of oil can be made up by the charge pump 108. This is a small capacity pump that pressurises the closed centre pump 100. These pumps are positive displacement pumps that are usually mounted on the back of the closed centre oil pump. In some cases the need for a charge pump 108 can be eliminated if the reservoir oil is above the closed centre oil pump and gravity produces the required pressure to eliminate the cavitation that lack of oil supply can cause. The relevance to this aspect of the invention is that the oil returning from linear hydraulic motors such as the one we use is not returned as a steady flow. The nature of the hydraulic motor 101 is such that all the oil is displaced from the hydraulic motor 101 during its upward stroke when the activating rod is pushed into the body of the motor. The design of the motor could be altered to rectify this but the nature of linear motors would still produce "spikes" in the oil flow and the pressure of the oil returning to the closed centre pump 100. To overcome this, the applicant has added a high pressure accumulator 109 to the intake side of the linear hydraulic motor 101 and a low pressure accumulator 110 to the return line 106 between the hydraulic motor 101 and the closed centre oil pump 100 to stop cavitation and reduce spiking in oil pressure.

Oil Pressure Build-Up in Return Line

The inclusion of these two accumulators did not completely stop the pressure spiking caused by the uneven oil flow out of the hydraulic motor. The friction present in any hydraulic system caused a small amount of oil to remain in the low pressure accumulator at the end of each stroke. The charge pump would add this amount of oil to the circuit and this continued until the accumulator was filled to the point it could not regulate the pressure in the return line. The pressure spikes caused by this accumulation of oil eventually led to pulsing in the paint pressure. To prevent the oil supplied by the charge pump 108 disrupting the operation of the paint motor 101, a bypass line 111 was added into the line from the hydraulic paint motor 101 to the closed centre hydraulic pump 100 and routed directly to the reservoir. This allowed the extra oil introduced by the charge pump to be bled back out of the system during the high point in the return flow. A restrictor which is preferable adjustable was put into the bypass line to stop too much excess oil returning to the reservoir which could result in cavitation.

The preferred embodiment includes two closed centre oil pumps 100, 200 operating in tandem with the second pump 200 operating to supply drive motor 116 of the drive system for the front wheel 5. The two closed centre pumps are powered by an internal combustion engine although other types of power supplies can be used within the scope of the invention. The second pump system is independent of the paint drive system although the two pumps 100, 200 do share the same oil reservoir 117 oil cooler 115 and charge pump 108.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A vehicle comprising:
a frame,
wheels supporting the frame, at least one of the wheels being a directional wheel which determines a direction of movement of the vehicle, and
a steering mechanism including:
a mounting for the directional wheel, the mounting including a steering shaft having an axis about which the directional wheel rotates to direct the direction of movement of the vehicle, the steering shaft being coupled to a steering actuator whereby rotation of the steering actuator produces a corresponding rotation of the steering shaft;
a control actuator responsive to an operator control device, wherein the operator control device is a steering wheel mounted in a fixed position on the frame for rotation on a steering column shaft about an axis, the steering column shaft mechanically cooperates or engages with the control actuator by means of a cog at an end of the steering column shaft engaging through a column actuator in the form of a groove or guide channel in the shaft with a chain or belt which in turn engages the control actuator; and
a universal joint providing mechanical engagement between the control actuator and the steering actuator, an axis of rotation of the control actuator being at an angle of 20° to 70° to the axis of rotation of the steering actuator, the control actuator having a first alignment corresponding to all of the wheels including the directional wheel being aligned,
whereby rotation of the control actuator produces a variable rotation of the steering actuator depending on the rotation of the control actuator away from the first alignment.

2. The vehicle of claim 1 wherein the universal joint provides mechanical engagement between the control actuator and the steering actuator, the axis of rotation of the control actuator being at an angle of 30° to 60° to the axis of rotation of the steering actuator, and the rotation of the control actuator produces the variable rotation of the steering actuator depending on the rotation of the control actuator away from the first alignment.

3. The vehicle of claim 1 wherein propulsion of the vehicle is provided by a drive motor and a speed of the vehicle is controlled by an operator using a throttle control comprising a pivotally mounted accelerator pedal which engages with a power supply to speed up or slow down the ground speed of the vehicle.

4. The vehicle of claim 3 wherein the throttle control further comprises
a proportional actuator responsive to pivotal movement of the accelerator pedal, the accelerator pedal having a first engagement position and a second engagement position for engagement by the operator, the first engagement position being at a end of the pedal distal to the mounting of the accelerator pedal and the second engagement position being intermediate the first position and the mounting of the accelerator pedal.

5. The vehicle of claim 4 wherein the accelerator pedal is mounted for rotation to the frame about a pivot axis provided by a control rod.

6. The vehicle of claim 5 wherein the steering actuator is mounted to a shaft which is provided with a contoured cammed wheel fixed to the shaft which rotates with the steering actuator on the shaft, the cammed wheel being in engagement with a fixed extension on the control rod which limits pivotal movement of the control rod and the accelerator pedal.

7. A vehicle comprising:
a frame,
wheels supporting the frame, at least one of the wheels being a directional wheel which determines a direction of movement of the vehicle, and
a steering mechanism including:
a mounting for the directional wheel, the mounting including a steering shaft having an axis about which the directional wheel rotates to direct the direction of movement of the vehicle, the steering shaft being coupled to a steering actuator whereby rotation of the steering actuator produces a corresponding rotation of the steering shaft;
a control actuator responsive to an operator control device, and
a universal joint providing mechanical engagement between the control actuator and the steering actuator, the universal joint comprising
a first U shaped mount having a base, the base of the first U mount being fixed to the steering actuator at a centre of rotation of the steering actuator and
a second U-shaped mount having a base fixed to a centre of rotation of the control actuator,
the first and second U-shaped mounts each being provided with hinge pins mounted for pivotal movement and cooperating through a common connection body, pivotal axes of the hinge pins being orthogonal through the common connection body, and
an axis of rotation of the control actuator being at an angle of 20° to 70° to the axis of rotation of the steering actuator, the control actuator having a first alignment corresponding to all of the wheels including the directional wheel being aligned,
whereby rotation of the control actuator produces a variable rotation of the steering actuator depending on the rotation of the control actuator away from the first alignment.

8. The vehicle of claim 7 wherein the vehicle is a line marking vehicle further comprising a line marking spray device fixed in position relative to the frame and the front directional wheel.

* * * * *